United States Patent Office 3,373,165
Patented Mar. 12, 1968

3,373,165
NOVEL SUBSTITUTED HYDRAZIYOHIMBANES
Anthony Edward Lanzilotti, Pearl River, and Leon Goldman, Nanuet, N.Y., assignors to American Cyanamid Company, Stamford, Conn., a corporation of Maine
No Drawing. Continuation-in-part of application Ser. No. 551,232, May 19, 1966. This application July 7, 1967, Ser. No. 651,672
10 Claims. (Cl. 260—287)

ABSTRACT OF THE DISCLOSURE

This disclosure describes 16-hydraziyohimbane and compounds of the class of ring-E substituted 17- and 18-hydraziyohimbanes, useful as central nervous system depressants.

Cross reference to related application

This application is a continuation-in-part of our copending application Ser. No. 551,232, filed May 19, 1966, now abandoned.

Brief summary of the invention

This invention relates to new organic compounds and, more particularly, is concerned with 16-hydraziyohimbane and novel hydraziyohimbanes which may be represented by the following structural formulae:

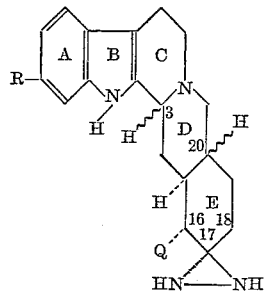

Formula I

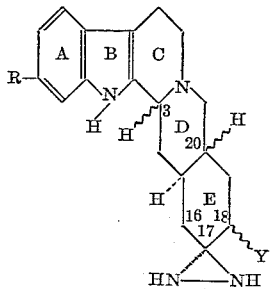

Formula II

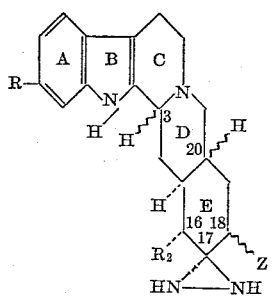

Formula III

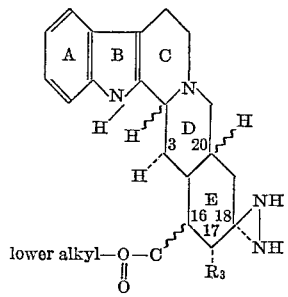

Formula IV

In these formulae, the various substituents have the following meanings:

Q is hydrogen, methyl or lower carboalkoxy;
Y is methyl, cyano, lower carboalkoxy or

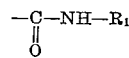

Z is lower alkyl, furfuryl or benzyl;
R is hydrogen or methoxy;
$R_1$ is phenyl or mono(lower alkyl)phenyl;
$R_2$ is hydrogen or methyl; and
$R_3$ is hydrogen or methoxy.

Suitable lower alkyl and lower carboalkoxy groups contemplated by the present invention are those having up to 6 carbon atoms.

Detailed description of the invention

The novel compounds of the present invention are, in general, white to tan crystalline solids, the free bases of which are soluble in organic solvents such as lower alkanols, chloroform, dimethylformamide, dioxane, pyridine, and the like; and the salts of which are soluble in polar solvents such as water and lower alkanols.

The novel compounds of the present invention may be readily prepared by reacting an appropriately substituted yohimbanone with hydroxylamine-O-sulfonic acid. The preparation of these appropriately substituted yohimbanone starting materials is set forth in the following references: Witkop, Ann. 554, 83 (1943); Janot et al., Bull. Soc. Chim. France, 1085 (1952); Hahn et al., Ber., 61, 278 (1928); Le Hir et al., Compt. rend., 246, 1564 (1958); Le Hir et al., Bull. Soc. Chim. France, 1091 (1952); Huebner et al., J. Am. Chem. Soc., 77, 472 (1955); Huebner et al., J. Am. Chem. Soc., 77, 5725 (1955); Albright et al., J. Org. Chem., 28, 38 (1963); Kimato et al., Chem. Pharm. Bull. (Tokyo), 7, 650 (1959); Hill et al., J. Org. Chem., 22, 1276 (1957); Wenkert et al., J. Am. Chem. Soc., 79, 6570 (1957); Albright et al., U.S. Patent No. 3,176,018; Shavel et al., U.S. Patent No. 3,139,428; Robison et al., J. Org. Chem., 28, 768 (1963); Mitscher et al., Experientia, 19, 195 (1963). Typical yohimbanone starting materials which may be employed to prepare the novel hydraziyohimbanes of the present invention are, for example, yohimban-17-one,
3-epiyohimban-17-one,
alloyohimban-17-one,
3-epialloyohimban-17-one,
reserpone,
11-methoxyalloyohimban-17-one,
16α-methylyohimban-17-one,
18α-methylyohimban-17-one,
methyl 17-oxoyohimban-16α-carboxylate,
methyl 17-oxoyohimbane-18α-carboxylate,
17-oxoyohimban-18α-carbonitrile,
17-oxoyohimban-18α-carboxanilide,
17-oxoyohimban-18α-carbox-p-toluidide, 18-isobutylyohimban-17-one,
18-benzylyohimban-17-one,
18-benzyl-16α-methylyohimban-17-one,
18-furfuryl-16α-methylyohimban-17-one,
yohimban-16-one,
methyl 18-ketoreserpate,
methyl 3-iso-18-ketoreserpate, and
methyl 11-methoxy-18-oxo-3-epialloyohimban-16α-carboxylate.

The interaction of the appropriately substituted yohimbanone starting materials and hydroxylamine-O-sulfonic acid is best carried out in a lower alkanol solvent such as methanol, ethanol, and the like, although other inert organic solvents may also be employed. The reaction is also best carried out in the presence of excess ammonia either in the gaseous or liquid form. The reaction temperature may range from −75° C. to 0° C. and the reaction time may vary from 3 hours to 24 hours or more. Equimolar quantities of the appropriately substituted yohimbanone and hydroxylamine-O-sulfonic acid may be employed although best results are obtained if an excess of hydroxylamine-O-sulfonic acid is used. The hydroxylamine-O-sulfonic acid may be added to a solution of the appropriately substituted yohimbanone either directly in the solid form or suspended or dissolved in a suitable inert solvent. When the reaction is complete, the solvents may be removed by evaporation and the product is suspended in an aqueous base such as sodium hydroxide, potassium hydroxide or ammonium hydroxide. The hydraziyohimbane produce is then extracted into a suitable inert solvent such as chloroform, benzene, toluene, and the like and may then be purified by conventional means. The hydroxylamine-O-sulfonic acid may also be employed as the ammonium salt or as a suspension in liquid ammonia. When carried out in this latter manner, the product of the reaction, after evaporation of the solvents, may be extracted directly into an inert solvent and then purified by conventional means.

The novel compounds of the present invention are valuable central nervous system depressants of low toxicity and were shown to possess CNS depressant activity as determined by animal experiments as follows. The compounds studied were administered intraperitoneally in a 2% starch vehicle to groups of six mice at three or more graded dose levels. At 15-minute and 30-minute intervals after treatment, each animal was placed on the midpoint of a horizontal steel rod (1.55 cm. in diameter and about 6 dm. in length), positioned 45.7 cm. above the surface of the table, and forced to walk toward a platform at either end of the rod. The criterion of inability to perform this act was consistent slipping to the side or falling off the rod. Effective doses for reduced rod-walking ability ($RWD_{50}$) were calculated or approximated from the data, and the time of peak effect was estimated from the data. One-half of the $RWD_{50}$ dose was given intraperitoneally to each mouse in groups of five. At the time of peak effect, as determined above, each group of mice was put into the actophotometer for a period of five minutes and the motor activity counts were recorded and compared to controls. Those compounds that appeared to reduce motor activity by 50% were administered to additional groups of five mice at graded doses and tested similarly. The dose ($MDD_{50}$) that caused a 50% reduction in motor activity was estimated. In a representative operation, and merely by way of illustration, 16-hydraziyohimbane and 17-hydraziyohimbane were shown to induce ataxia ($RWD_{50}$) and reduce locomotor activity ($MDD_{50}$) as set forth in Table I below:

TABLE I

| Compound | $RWD_{50}$, mg./kg. of body weight | $MDD_{50}$, mg./kg. of body weight |
| --- | --- | --- |
| 16-hydraziyohimbane | 31 | 0.9 |
| 17-hydraziyohimbane | 50 | 7.0 |

The present invention also embraces the useful non-toxic pharmaceutically acceptable acid-addition salts of these novel compounds. Typtical acid-addition salts are the hydrochlorides, hydrobromides, sulfates, citrates, tartrates, succinates, and the like. Although the novel compounds of the present invention may be used as such, they are more preferably administered in the form of their non-toxic acid-addition salts which may be readily prepared by treatment with one or two equivalents of an acid such as hydrochloric, sulfuric, phosphoric, citric, etc., in a suitable solvent.

The invention will be described in greater detail in conjunction with the following specific examples.

EXAMPLE 1

Preparation of 17-hydraziyohimbane

Liquid ammonia (250 ml.) is added to a stirred solution of 5.99 g. of yohimban-17-one in 1500 ml. of methanol, previously cooled to −30° C. by means of a Dry Ice-acetone bath. A suspension of 3.50 g. of hydroxylamine-O-sulfonic acid in 250 ml. of liquid ammonia is then added over a period of 30 minutes and the reaction mixture is allowed to stir for 4 hours while being kept at −30° C. The cooling bath is removed and the reaction mixture is allowed to stir for an additional 18 hours. The suspended solids are collected by filtration and washed with three 100-ml. portions of methanol. The combined methanol filtrates are concentrated under reduced pressure on a water bath to give a residual brown solid which gives a positive starch-iodide test. The residue is dissolved in chloroform and the solution is chromatographed in a column of 250 g. of silica gel. Elution with chloroform containing 1.5% of methanol and evaporation of the eluates yields 1.48 g. of crystals which, after recrystallization from chloroform-heptane, gives 17-hydraziyohimbane as white crystals, M.P. 233–235° C. dec.

Other compounds which can be prepared according to the above-described procedure are, for example:

17-hydrazi-3-epiyohimbane,
17-hydrazi-11-methoxy-3-epialloyohimbane,
17-hydrazi-11-methoxyalloyohimbane,
17-hydrazi-16α-methylyohimbane, and
methyl 17-hydraziyohimban-16α-carboxylate.

EXAMPLE 2

Preparation of 17-hydraziyohimbane

A solution of 2.50 g. of yohimban-17-one in 600 ml. of methanol is cooled to 0° C. and added to 300 ml. of liquid ammonia. The solution is cooled to −45° C. by means of a Dry Ice-acetone bath. To this stirred solution there is added 1.45 g. of hydroxylamine-O-sulfonic acid, in portions, over a period of 15 minutes. The reaction mixture is stirred at −45° C. for 4 hours after which the cooling bath is removed and the reaction mixture is allowed to stir for 18 hours. The solution is concentrated to dryness under reduced pressure on a water bath and the residue is distributed between 100 ml. of 5% sodium hydroxide and 100 ml. of dichloromethane. The dichloromethane solution is washed with water, dried over magnesium sulfate, and concentrated to dryness under reduced pressure to give 4.01 g. of a tan solid which gives a positive starch-iodide test. The crude product is subjected to partition chromatography on diatomaceous earth using a heptane-dichloroenthane-N,N-dimethylformamide-water solvent system (45:25:15:3). The product is isolated from the fraction with peak at 3.5 holdback volumes and is recrystallized from chloroform-heptane to give 17-hydraziyohimbane as white crystals, M.P. 233–235° C. dec.

Other compounds which can be prepared according to the above-described procedure are, for example:

17-hydrazialloyohimbane,
17-hydrazi-18α-methylyohimbane,
methyl 17-hydraziyohimban-18α-carboxylate,
17-hydraziyohimban-18α-carbonitrile,
17-hydraziyohimban-18α-carboxanilide, and
17-hydraziyohimban-18α-carbox-p-toluidide.

EXAMPLE 3

*Preparation of 17-hydraziyohimbane*

A stirred solution of 2.50 g. of yohimban-17-one in 400 ml. of methanol is cooled to 0° C. and is saturated with ammonia. Then 1.50 g. of hydroxylamine-O-sulfonic acid is added in portions over a 30 minute period while the temperature is maintained at −5 C. to −10° C. by means of a Dry Ice-acetone bath. The reaction mixture is allowed to stir for 2 hours at −5° C. and then for an additional 12 hours at room temperature. The resulting mixture is concentrated to dryness under reduced pressure on a water bath and the residue is suspended in 50 ml. of 6 N ammonium hydroxide. The insoluble product is collected by filtration and washed with two 25-ml. portions of water. The solid is dissolved in 300 ml. of ethanol at 70° C. and the solution is filtered. The filtrate is concentrated to dryness under reduced pressure on a water bath to give 1.98 g. of a tan solid. Recrystallization from ethyl acetate gives 17-hydraziyohimbane as tan crystals, solvated with ethyl acetate, M.P. 213–215° C. dec.

Other compounds which can be prepared according to the above-described procedure are, for example:

17-hydrazi-3-epialloyohimbane,
17-hydrazi-18-isobutylyohimbane,
17-hydrazi-18-benzylyohimbane,
17-hydrazi-18-benzyl-16α-methylyohimbane, and
17-hydrazi-18-furfuryl-16α-methylyohimbane.

EXAMPLE 4

*Preparation of 16-hydraziyohimbane*

Liquid ammonia (200 ml.) is added to a stirred solution of 2.50 g. of yohimban-16-one in 1000 ml. of methanol previously cooled to −30° C. by means of a Dry Ice-acetone bath. Then 2.89 g. of hydroxylamine-O-sulfonic acid is added to 200 ml. of liquid ammonia, and the resulting mixture is added to the cooled solution of yohimban-16-one over a period of 30 minutes. The reaction mixture is allowed to stir at −30° C. for 4 hours. The cooling bath is removed and the reaction mixture is allowed to stir for an additional 48 hours. The suspended solids are collected by filtration and washed with three 100-ml. portions of methanol. The combined methanol filtrates are concentrated on a water bath under reduced pressure to give 2.67 g. of a tan solid which gives a positive starch-iodide test. The solid is dissolved in dichloromethane and chromatographed on a column of 100 g. of silica gel. Elution with dichloromethane containing 2% methanol and evaporation of the eluates affords 1.22 g. of white crystals. Recrystallization from ethanol gives 16-hydraziyohimbane, M.P. 223–225° C. dec.

EXAMPLE 5

*Preparation of methyl 11,17α-dimethoxy-18-hydrazi-3-epialloyohimban-16β-carboxylate*

A solution of 2.07 g. of methyl 11,17α-dimethoxy-18-oxo-3-epialloyohimban-16β-carboxylate in 200 ml. of methanol is cooled to −5° C. Then, 50 ml. of liquid ammonia is added and the reaction mixture is stirred for one hour at −15° C. To this mixture is added 2.84 g. of hydroxylamine-O-sulfonic acid, in portions, over a period of 30 minutes and the reaction mixture is stirred at −10° C. to −15° C. for 18 hours. The suspended solids are removed by filtration and the methanol filtrate is concentrated to dryness under reduced pressure to give 2.93 g. of an orange solid which gives a positive starch-iodide test. Crystallization gives methyl 11,17α-dimethoxy-18-hydrazi-3-epialloyohimban-16β-carboxylate.

Other compounds which can be prepared according to the above-described procedure are, for example:

methyl 11,17α-dimethoxy-18-hydrazi-alloyohimban-16β-carboxylate, and
methyl 11-methoxy-18-hydrazi-3-epialloyohimban-16α-carboxylate.

What is claimed is:

1. A hydraziyohimbane compound selected from the group consisting of those of the formulae:

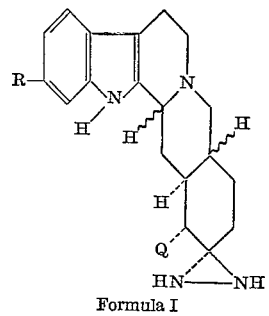

Formula I

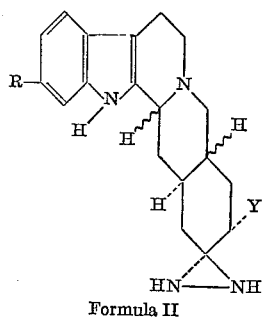

Formula II

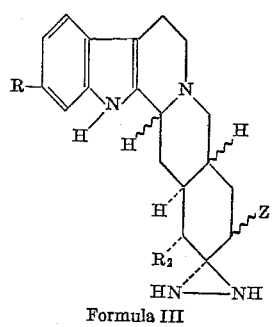

Formula III

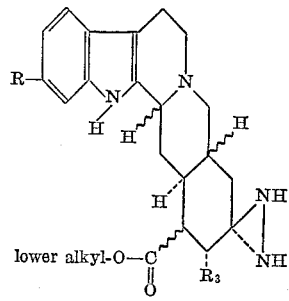

Formula IV and the pharmaceutically acceptable acid-addition salts thereof wherein, in the foregoing formulae, the various substituents have the following values:

Q is selected from the group consisting of hydrogen, methyl and lower carboalkoxy;

Y is selected from the group consisting of methyl, cyano, lower carboalkoxy and $$-\underset{\underset{O}{\|}}{C}-NH-R_1$$

Z is selected from the group consisting of lower alkyl, furfuryl and benzyl;
R is selected from the group consisting of hydrogen and methoxy;
$R_1$ is selected from the group consisting of phenyl and mono(lower alkyl)phenyl;
$R_2$ is selected from the group consisting of hydrogen and methyl; and
$R_3$ is selected from the group consisting of hydrogen and methoxy.

2. A compound according to Formula I of claim 1 wherein Q is hydrogen and R is hydrogen, said compound having the normal configuration at the 3-position and the normal configuration at the 20-position.

3. A compound according to Formula I of claim 1 wherein Q is hydrogen and R is methoxy, said compound having the epi configuration at the 3-position and the allo configuration at the 20-position.

4. A compound according to Formula I of claim 1 wherein Q is carbomethoxy and R is hydrogen, said compound having the normal configuration at the 3-position and the normal configuration at the 20-position.

5. A compound according to Formula II of claim 1 wherein Y is methyl and R is hydrogen, said compound having the normal configuration at the 3-position and the normal configuration at the 20-position.

6. A compound according to Formula II of claim 1 wherein Y is cyano and R is hydrogen, said compound having the normal configuration at the 3-position and the normal configuration at the 20-position.

7. A compound according to Formula II of claim 1 wherein Y is carboxanilido and R is hydrogen, said compound having the normal configuration at the 3-position and the normal configuration at the 20-position.

8. A compound according to Formula III of claim 1 wherein Z is α-benzyl, $R_2$ is methyl and R is hydrogen; said compound having the normal configuration at the 3-position and the normal configuration at the 20-position.

9. A compound according to Formula IV of claim 1 wherein R is methoxy, $R_3$ is methoxy and "lower alkyl" is methyl; said compound having the epi configuration at the 3-position, the allo configuration at the 20-position and the beta configuration at the 16-position.

10. The compound 16-hydraziyohimbane.

References Cited

UNITED STATES PATENTS 3,260,721  7/1966  Albright et al. _____ 260—256.4

JAMES A. PATTEN, *Primary Examiner.*

UNITED STATES PATENT OFFICE
CERTIFICATE OF CORRECTION

Patent No. 3,373,165            March 12, 1968

Anthony Edward Lanzilotti et al.

It is hereby certified that error appears in the above numbered patent requiring correction and that the said Letters Patent should read as corrected below.

Column 1, Formula II, should appear as shown below instead of as in the patent:

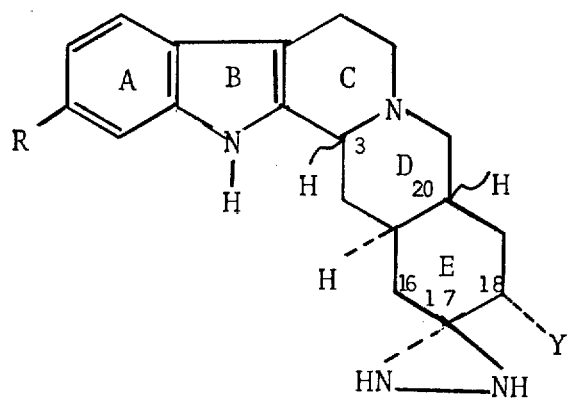

column 2, Formula IV, should appear as shown below instead of as in the patent:

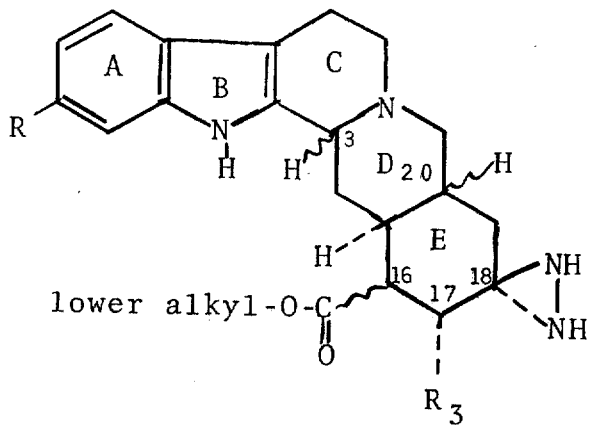

Signed and sealed this 29th day of July 1969.

(SEAL)
Attest:

EDWARD M. FLETCHER, JR.　　　　　　　WILLIAM E. SCHUYLER, JR.
Attesting Officer　　　　　　　　　　　Commissioner of Patents